(12) United States Patent
Toshinaga et al.

(10) Patent No.: US 12,022,310 B2
(45) Date of Patent: Jun. 25, 2024

(54) SHIELDING RATE CALCULATING APPARATUS, SHIELDING RATE CALCULATING METHOD AND PROGRAM

(71) Applicant: NIPPON TELEGRAPH AND TELEPHONE CORPORATION, Tokyo (JP)

(72) Inventors: Hideki Toshinaga, Musashino (JP); Hideyuki Tsuboi, Musashino (JP); Kazuto Goto, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 368 days.

(21) Appl. No.: 17/624,556

(22) PCT Filed: Jul. 5, 2019

(86) PCT No.: PCT/JP2019/026828
§ 371 (c)(1),
(2) Date: Jan. 3, 2022

(87) PCT Pub. No.: WO2021/005646
PCT Pub. Date: Jan. 14, 2021

(65) Prior Publication Data
US 2022/0256374 A1 Aug. 11, 2022

(51) Int. Cl.
*H04W 24/08* (2009.01)
*H04B 1/3827* (2015.01)

(52) U.S. Cl.
CPC .......... *H04W 24/08* (2013.01); *H04B 1/3838* (2013.01)

(58) Field of Classification Search
CPC ..... H04W 24/08; H04W 24/02; H04W 16/18; H04W 4/40; H04B 1/3838
See application file for complete search history.

(56) References Cited

U.S. PATENT DOCUMENTS

2017/0013413 A1* 1/2017 Singh .................. G05D 1/0011

OTHER PUBLICATIONS

Djordje Tujkovic, et al., Change to IEEE 802.11ay in support of mmW Distribution Network Use cases, literature, Jul. 10, 2017; https://mentor.ieee.org/802.11/dcn/17/11-17-1022-00-00ay-changes-to-ieee-802-11ay-in-support-of-mmw-mesh-network-use-cases.pptx.

Nippon Telegraph and Telephone Corporation, Enhanced assistance of equipment maintenance with space-state estimation technology, Large-scale 3D point cloud analysis technology enables construction of real-world database, NTT R & D Forum 2017, Feb. 16, 2017; http://labevent.ecl.ntt.co.jp/forum2017/elements/pdf_jpn/02/B-10_j.pdf.

* cited by examiner

*Primary Examiner* — Keith Ferguson
(74) *Attorney, Agent, or Firm* — Harness, Dickey & Pierce, P.L.C.

(57) ABSTRACT

One aspect of the present invention is a shielding rate calculation device including a voxel division unit for dividing a Fresnel zone into a plurality of voxels each having a size corresponding to acquisition conditions at the time of acquiring point group data indicating a shielding object in an inter-wireless-station space between a transmission station and a reception station, and a calculation unit for calculating a shielding rate against a radio wave traveling from the transmission station toward the reception station on the basis of a position, a shape, and a size of a shielding voxel, which is a voxel at a position indicated by the point group data, among the plurality of voxels.

8 Claims, 11 Drawing Sheets

SHIELDING RATE CALCULATING APPARATUS, SHIELDING RATE CALCULATING METHOD AND PROGRAM

CROSS-REFERENCE TO RELATED APPLICATIONS

This application is a 371 U.S. National Phase of International Application No. PCT/JP2019/026828 filed on Jul. 5, 2019. The entire disclosure of the above application is incorporated herein by reference.

TECHNICAL FIELD

The present invention relates to a shielding rate calculation device, a shielding rate calculation method, and a program.

BACKGROUND ART

Conventionally, a method of utilizing millimeter waves for the infrastructure of a communication network has been proposed in IEEE802.11ay (Non-Patent Literature 1). On the other hand, a technique in which three-dimensional point group data is utilized for monitoring infrastructure is being studied (Non-Patent Literature 2). For example, a method of a line-of-sight determination using the point group data is described in Non-Patent Literature 2. This method sets a lattice-like voxel having a certain size to make a determination when the line-of-sight determination on the basis of the point group data is executed.

CITATION LIST

Non-Patent Literature

Non-Patent Literature 1: D. Tujkovic et al., "Changes to IEEE 802.11ay in support of mmW Distribution Network Use Cases", IEEE 802.11-17/1022r0 (July 2017), [online], [searched on Jul. 1, 2019], Internet <URL: https://mentor.ieee.org/802.11/dcn/17/11-17-1022-00-00ay-changes-to-ieee-802-11ay-in-support-of-mmw-mesh-network-use-cases.pptx>

Non-Patent Literature 2: NTT, "Setsubi hoshu sagyou wo suishinsuru kukanjotai suitei gijutsu" (in Japanese) ("Space condition estimation technique that facilitates facility maintenance work"), R&D Forum 2017, B-10, [online], [Searched on Jul. 1, 2019], Internet <URL: http://www.ntt.co.jp/RD/active/201702/jp/pdf_jpn/02/B-10_j.pdf>

SUMMARY OF THE INVENTION

Technical Problem

In a technique for evaluating a shielding rate against a radio wave by using the point group data, such as the line-of-sight determination described above, the point group data acquired by a mobile mapping system (MMS) may be used. However, in the case as described above, a point group density may differ depending on the distance between a moving body such as a vehicle and a shielding object, or the movement of the moving body including the moving speed of the moving body. For this reason, when a line-of-sight determination is made for a Fresnel zone between wireless stations, it may not be possible to correctly evaluate the ratio of shielding objects if the determination is made on the basis of a uniform voxel size without considering the difference in the point group density.

In view of the above circumstances, it is an object of the present invention to provide a technique for improving the accuracy of evaluation in a technique for evaluating a shielding rate against a radio wave by using point group data.

Means for Solving the Problem

One aspect of the present invention is a shielding rate calculation device including a voxel division unit for dividing a Fresnel zone into a plurality of voxels each having a size corresponding to acquisition conditions at the time of acquiring point group data indicating a shielding object in an inter-wireless-station space between a transmission station and a reception station, and a calculation unit for calculating a shielding rate against a radio wave traveling from the transmission station toward the reception station on the basis of a position, a shape, and a size of a shielding voxel, which is a voxel at a position indicated by the point group data, among the plurality of voxels.

One aspect of the present invention is a shielding rate calculation method including a voxel division step of dividing a Fresnel zone into a plurality of voxels each having a size corresponding to acquisition conditions at the time of acquiring point group data indicating a shielding object in an inter-wireless-station space between a transmission station and a reception station, and a calculation step of calculating a shielding rate against a radio wave traveling from the transmission station toward the reception station on the basis of a position, a shape, and a size of a shielding voxel, which is a voxel at a position indicated by the point group data, among the plurality of voxels.

One aspect of the present invention is a program for causing a computer to function as the above-described shielding rate calculation device.

Effects of the Invention

According to the present invention, it is possible to provide a technique for improving the accuracy of evaluation in a technique for evaluating a shielding rate against a radio wave by using point group data.

DESCRIPTION OF EMBODIMENTS

Figure 1:
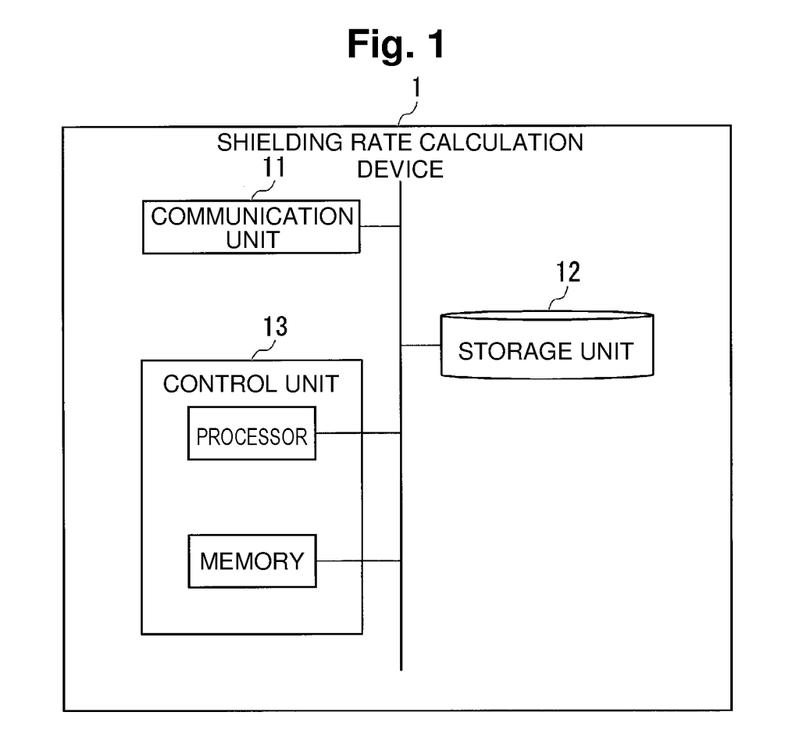
FIG. 1 is a diagram showing an example of a functional configuration of a shielding rate calculation device of an embodiment.

FIG. 1 is a diagram showing an example of a functional configuration of a shielding rate calculation device 1 of an embodiment. The shielding rate calculation device 1 is a wireless communication system including two wireless stations, and calculates a radio wave shielding rate in the wireless communication system to be analyzed by using point group data indicating a shielding object between the wireless stations. The radio wave shielding rate is a ratio at which a radio wave radiated from a wireless station on the transmitting side (hereinafter referred to as a "transmission station") is shielded before reaching a wireless station on the receiving side (hereinafter referred to as a "reception station").

(Method of Acquiring the Point Group Data)

Figure 2:
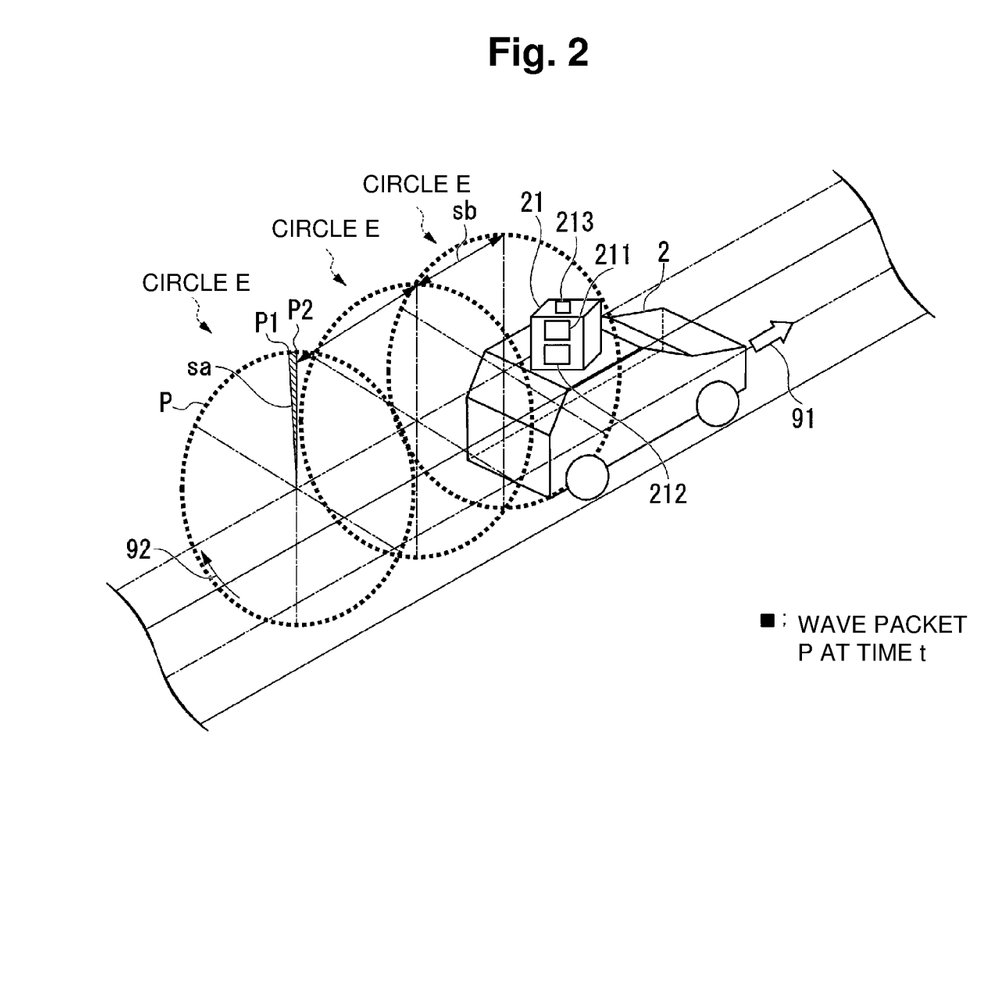
FIG. 2 is a first explanatory diagram illustrating a method of acquiring point group data in an embodiment.

Hereinafter, a method of acquiring the point group data to be used by the shielding rate calculation device 1 will be described. FIG. 2 is a first explanatory diagram illustrating a method of acquiring the point group data in the embodiment. FIG. 2 shows a moving body 2 and a three-dimensional laser scanner 21. The moving body 2 may be, for example, a car or a drone. In FIG. 2, the moving body 2 moves in the direction of an arrow 91. The moving body 2 is provided with the three-dimensional laser scanner 21. The three-dimensional laser scanner 21 moves together with the moving body 2. The three-dimensional laser scanner 21 is provided with an emission unit 211, a reception unit 212, and a point group data calculation unit 213. The emission unit 211 emits a laser intermittently at a constant cycle. The emission unit 211 emits the laser while rotating the direction of laser emission at a constant angular velocity. The reception unit 212 receives a reflected wave of the laser emitted by the emission unit 211. The point group data calculation unit 213 calculates, on the basis of information on the reflected wave received by the reception unit 212, a position and a time of the laser reflection.

More specifically, the three-dimensional laser scanner 21 emits the laser into a plane (hereinafter referred to as a "laser emitted plane") located at a fixed position when viewed from the three-dimensional laser scanner 21. The three-dimensional laser scanner 21 changes the emission direction at a constant angular velocity so that the emission direction rotates $2\pi K$ rad (K is a positive real number) per unit time on the laser emitted plane. For example, the three-dimensional laser scanner 21 changes the direction of laser emission in the direction of an arrow 92. Since the three-dimensional laser scanner 21 emits the laser intermittently at a constant cycle, the laser emitted by the three-dimensional laser scanner 21 is a wave packet P of electromagnetic waves emitted intermittently at a constant cycle. FIG. 2 shows a position of the wave packet P at a certain time t. Since the wave packet P is radiated by the three-dimensional laser scanner 21 so as to rotate 360° at a constant cycle, a circle E is formed. The wave packet P is reflected by a shielding object. A set of information indicating a position at which the wave packet P is reflected and a time at which the wave packet P is reflected (hereinafter referred to as "point information") is the point group data. Note that in FIG. 2, the positions of the plurality of wave packets P emitted by the three-dimensional laser scanner 21 are shown with the plurality of circles E for the purpose of simplifying the description. However, in reality, the plurality of wave packets P form a spiral. The circle E in FIG. 2 is a shape schematically representing one winding of the spiral.

The three-dimensional laser scanner 21 receives a reflected wave of the emitted wave packet P, and calculates, on the basis of the received time and position, a position and a time at which the received wave packet P has been reflected. A set of information indicating the position and the time, at which the wave packet P has been reflected, that are calculated by the three-dimensional laser scanner 21, is the point group data.

The moving speed of the moving body 2 affects a scan line interval sb. The scan line interval sb is a distance between the two adjacent circles E. One circle E is a figure formed by the wave packet P emitted while the emission direction of the laser rotates by 360°. Therefore, the scan line interval sb changes according to the moving speed of the moving body 2.

In addition, the distance between the moving body 2 and the shielding object affects an adjacent point interval sa in the scan line. The adjacent point interval sa in the scan line is a distance between the position at which a wave packet P1 has been reflected and the position at which a wave packet P2 has been reflected. The wave packet P1 is one of the wave packets P, and the wave packet P2 is a wave packet P emitted following the wave packet P1. Since the distance to be propagated before the wave packet P is reflected changes depending on the distance between the moving body 2 and the shielding object, the distance between the moving body 2 and the shielding object affects the adjacent point interval sa in the scan line.

As described above, the scan line interval sb changes according to the moving speed of the moving body 2, and the adjacent point interval sa in the scan line changes according to the distance from the moving body 2 to the shieling object. Therefore, the density of the point group data differs according to the moving speed of the moving body 2 and the distance from the moving body 2 to the shielding object. When the positions indicated by the point information are plotted in a virtual three-dimensional space, the density of the point group data is the number of the plotted points (hereinafter referred to as "point group data points") included in a unit cell in the virtual three-dimensional model.

Figure 3:
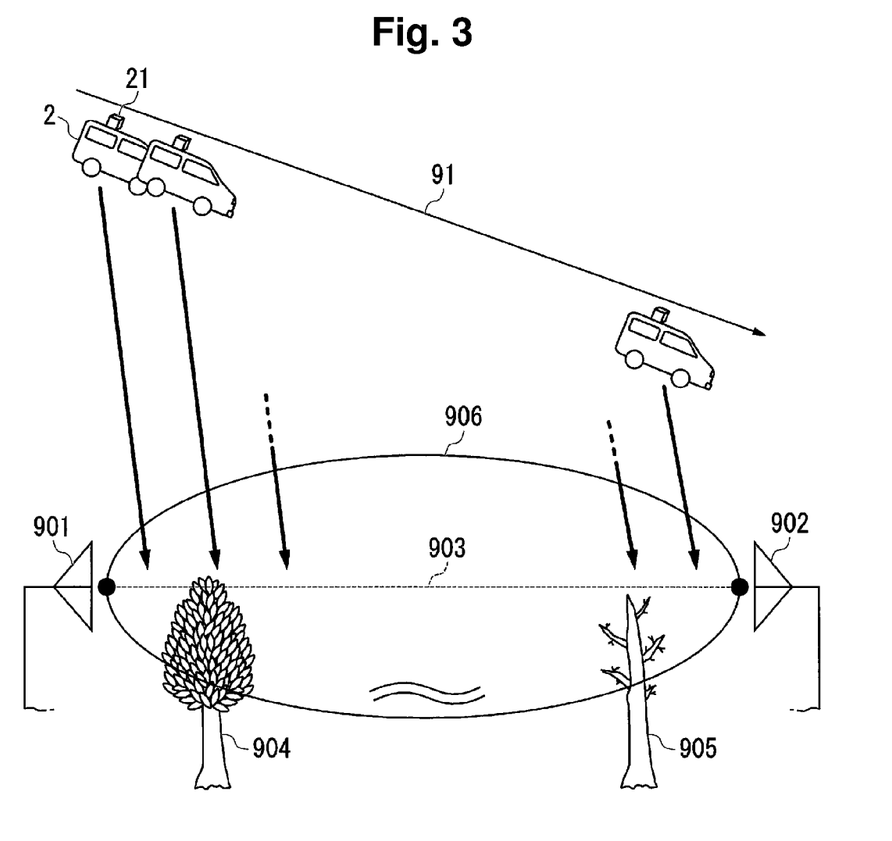
FIG. 3 is a second explanatory diagram illustrating a method of acquiring the point group data in an embodiment.

FIG. 3 is a second explanatory diagram illustrating a method of acquiring the point group data in the embodiment. FIG. 3 shows a transmission station 901 and a reception station 902 in the wireless communication system to be analyzed. FIG. 3 shows that the moving body 2 provided with the three-dimensional laser scanner 21 is moving in the direction of the arrow 91. In FIG. 3, a straight line pointing in the direction of the arrow 91 is not parallel to a line segment connecting the transmission station 901 and the reception station 902 (hereinafter referred to as a "station-connecting line segment 903"). In FIG. 3, the three-dimensional laser scanner 21 emits the laser while moving. FIG. 3 show that a time from the laser emission to the arrival at the station-connecting line segment 903 changes as the moving body 2 moves, because the straight line pointing in the direction of the arrow 91 and the station-connecting line segment 903 are not parallel to each other. FIG. 3 shows that the distance between the moving body 2 and a first shielding object 904 or a second shielding object 905 also changes as the moving body 2 moves. Note that the moving speed of the moving body 2 that acquires the point group data may not be constant, and the moving direction may not be constant, either.

Figure 4:
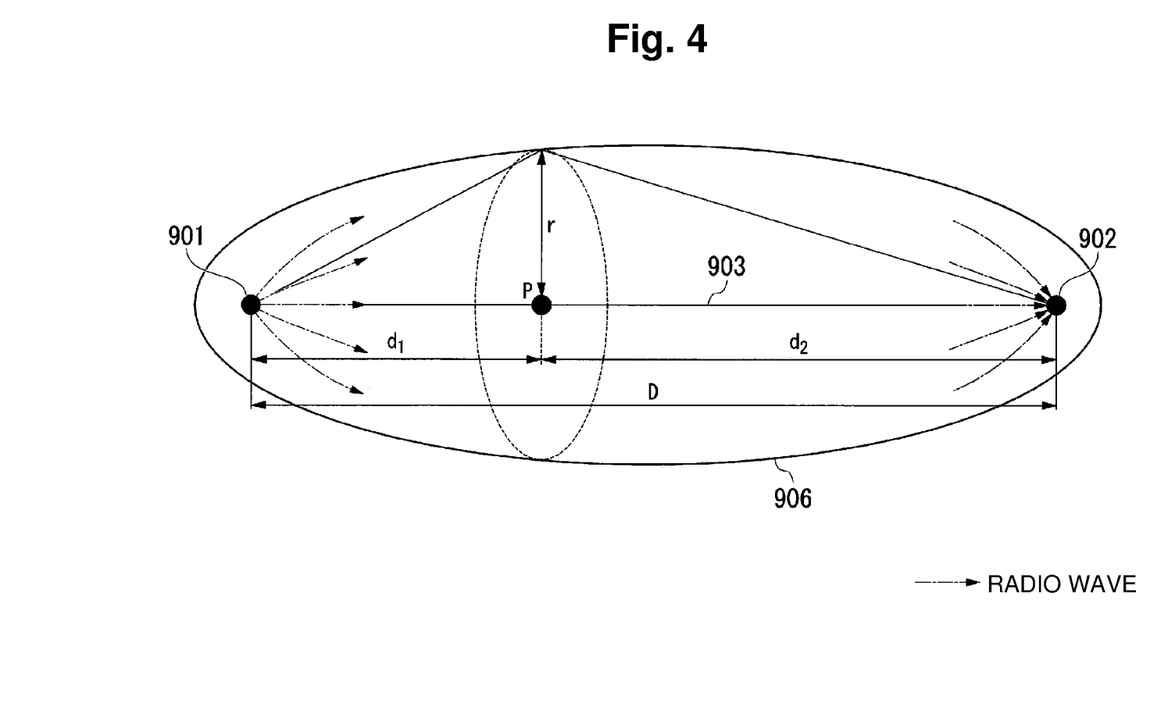
FIG. 4 is an explanatory diagram illustrating a Fresnel zone.

In addition, FIG. 3 shows a Fresnel zone 906 between the transmission station 901 and the reception station 902. FIG. 4 is an explanatory diagram illustrating the Fresnel zone 906. The Fresnel zone 906 is a set of propagation paths of the radio waves radiated from the transmission station 901 until the radio waves reach the reception station 902 when there is no object between the transmission station 901 and the reception station 902 to shield the radio waves radiated from the transmission station 901. As shown in FIG. 4, the radio waves spread after being radiated from the transmission station 901, and thereafter converge and reach the reception station 902. The Fresnel zone 906 is a spheroid having the station-connecting line segment 903 as an axis. The radius r of a cross section of the Fresnel zone 906 perpendicular to the station-connecting line segment 903 and located at a position with a distance $d_1$ from the transmission station 901 and with a distance $d_2$ (=D-$d_1$) from the reception station is represented by the following expression (1). Note that D is the length of the station-connecting line segment 903. In the expression (1), $\lambda$ is the wavelength of the radio wave.

[Math. 1]

$$r \approx \sqrt{\lambda \frac{d_1 d_2}{d_1 + d_2}} \qquad (1)$$

The description of the acquisition method of the point group data ends here, and the description returns to FIG. 1.

The shielding rate calculation device 1 is provided with a communication unit 11, a storage unit 12, and a control unit 13. The communication unit 11 includes a communication interface for connecting the communication unit 11 to an external device. The communication unit 11 communicates with the external device wirelessly or through a wire. The communication unit 11 acquires various information outputted by the external device. The external device may be, for example, an input terminal such as a keyboard or a touch panel that can be operated by a user, or may be a computer connected to the input terminal. The communication unit 11 acquires, for example, information outputted by the external device and indicating the positions of the transmission station and the reception station in the wireless communication system to be analyzed (hereinafter referred to as "wireless station information"). The communication unit 11 outputs the acquired wireless station information to the control unit 13.

The storage unit 12 is configured by using a non-transitory computer-readable storage medium such as a magnetic hard disk device or a semiconductor storage device. The storage unit 12 stores, for example, the point group data acquired in advance by the three-dimensional laser scanner 21 included in the moving body 2. The storage unit 12 stores information indicating acquisition conditions when the moving body 2 and the three-dimensional laser scanner 21 acquire the point group data (hereinafter referred to as "acquisition condition information"). The acquisition condition information includes information on the movement of the moving body 2 at the time of acquiring the point group data (hereinafter referred to as "moving body information"). Since the three-dimensional laser scanner 21 is fixed to the moving body 2, the information on the movement of the moving body 2 is information on the movement of the three-dimensional laser scanner 21. The moving body information is, for example, information indicating a change in time of the speed of the moving body 2 and the direction of the movement at the time of acquiring the point group data. The acquisition condition information includes information indicating the emission direction of the wave packet of the laser emitted by the three-dimensional laser scanner 21 at the time of acquiring the point group data (hereinafter referred to as "emission direction information"). The acquisition condition information includes information on the emission timing of the wave packet of the laser emitted by the three-dimensional laser scanner 21 at the time of acquiring the point group data (hereinafter referred to as "emission timing information"). The emission direction information may be, for example, information indicating a change in time of the direction in which the wave packet is emitted. The emission direction information may be, for example, information indicating an angular velocity at which the emission direction of the wave packet rotates. The emission timing information may be, for example, information indicating a time at which the wave packet is emitted. The emission timing information may be information indicating an emission interval.

The control unit 13 is configured by using a processor such as a CPU (Central Processing Unit) and a memory. The control unit 13 operates by executing a program stored in the storage unit 12. More specifically, the processor included in the control unit 13 reads out the program stored in the storage unit 12, and stores, in the memory, the program that has been read out. The processor included in the control unit 13 operates by executing the program stored in the memory. The control unit 13 controls an operation of each functional unit included in the shielding rate calculation device 1 by executing the program. The control unit 13 calculates, by executing the program, a radio wave shielding rate in the wireless communication system to be analyzed, for example, on the basis of the point group data.

Figure 5:
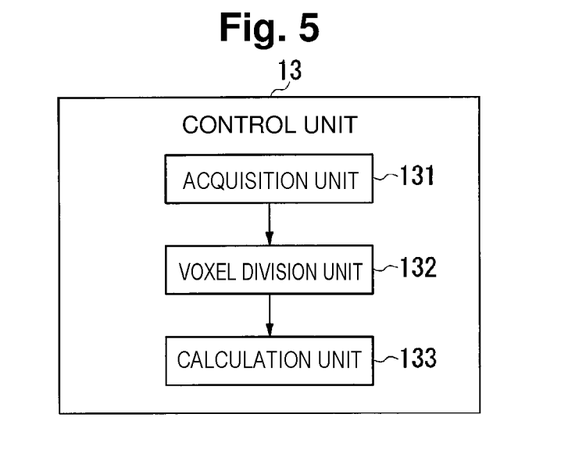
FIG. 5 is a diagram showing an example of a functional configuration of a control unit in an embodiment.

FIG. 5 is a diagram showing an example of a functional configuration of the control unit 13 in the embodiment. The control unit 13 is provided with an acquisition unit 131, a voxel division unit 132, and a calculation unit 133. The acquisition unit 131 acquires various information necessary for calculating the radio wave shielding rate acquired by the communication unit 11 and various information necessary for calculating the radio wave shielding rate stored in the storage unit 12. The acquisition unit 131 acquires, for example, the point group data and the acquisition condition information. The voxel division unit 132 executes, on a computer, a process of dividing the Fresnel zone into a plurality of voxels each having a size corresponding to the acquisition condition information. The calculation unit 133 executes, on a computer, a process of calculating the radio wave shielding rate on the basis of a position, a shape, and a size of a voxel, among the plurality of voxels divided by the voxel division unit 132, at the position indicated by the point group data. Hereinafter, for the purpose of simplifying the description, a case in which the voxel has a shape of a rectangular parallelepiped including a cube will be described as an example. However, the voxel may be a column with a bottom surface having a regular polygonal shape.

Figure 6:
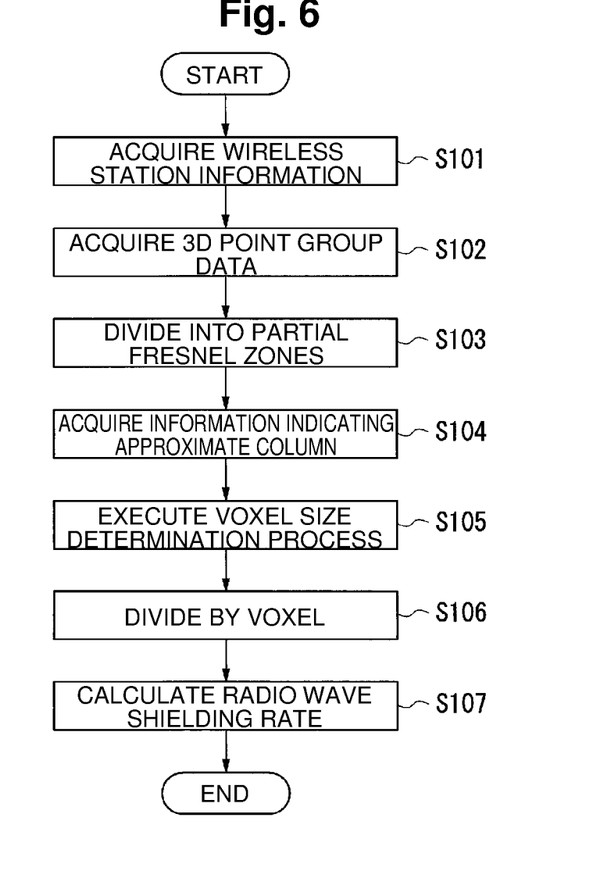
FIG. 6 is a flowchart showing an example of a specific processing flow in which the control unit of an embodiment calculates a radio wave shielding rate.

FIG. 6 is a flowchart showing an example of a specific processing flow in which the control unit 13 of the embodiment calculates the radio wave shielding rate. Note that the transmission station 901 and the reception station 902 in each process shown in the flowchart of FIG. 6 are the transmission station 901 and the reception station 902 in the virtual space representing the transmission station 901 and the reception station 902 in the real space.

The acquisition unit 131 acquires the wireless station information (step S101). Subsequently, the acquisition unit 131 acquires the point group data (step S102). Subsequently, the voxel division unit 132 divides an inter-wireless-station space into N (N is an integer of 1 or more) equal spaces (hereinafter referred to as "subspaces") in the direction of from the transmission station 901 toward the reception station 902 (Step S103). The inter-wireless-station space is a space between the transmission station 901 and the reception station 902. More specifically, the control unit 13 divides the space between the wireless stations into N subspaces by (N+1) dividing surfaces. The dividing surfaces are planes located at equal intervals in the direction along the station-connecting line segment 903 and perpendicular to the station-connecting line segment 903. Hereinafter, among the N subspaces, the subspace that is the n-th (n is an integer of 1 or more and N or less) closest to the transmission station is referred to as the n-th subspace. Note that the number N that divides the inter-wireless-station space may be received from the external device via the communication unit 11 or may be stored in the storage unit 12 in advance.

Figure 7:
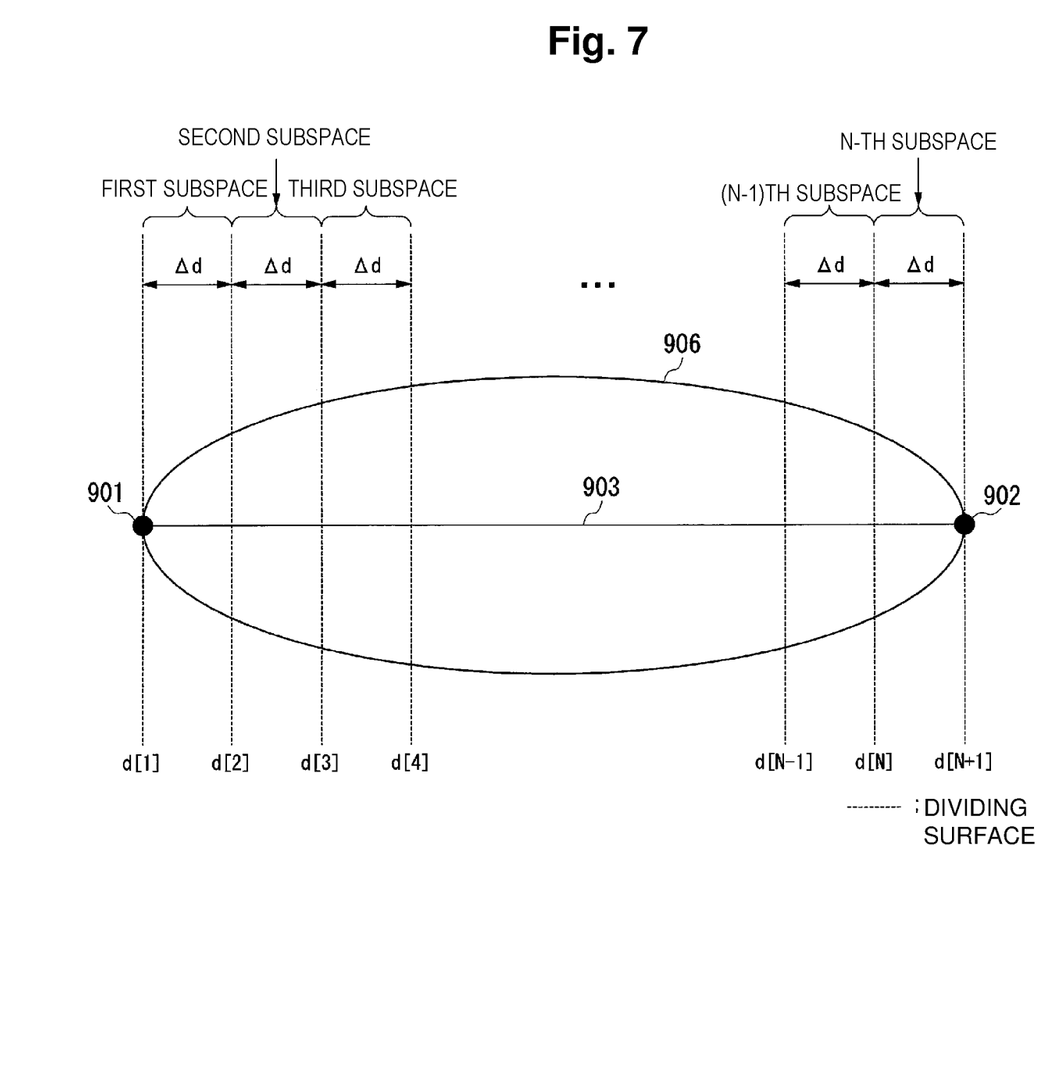
FIG. 7 is an explanatory diagram illustrating that the space between wireless stations in an embodiment is divided into N subspaces by (N+1) dividing surfaces.

FIG. 7 is an explanatory diagram illustrating that the space between the wireless stations in the embodiment is divided into the N subspaces by the (N+1) dividing surfaces. FIG. 7 shows that the space between the wireless stations including the Fresnel zone 906 is divided into the N spaces by the (N+1) dividing surfaces respectively located at distances d[1] to d[N+1] from the transmission station. The distance d[1]=0 and the distance d[N+1]=D. The gap between d[n+1] and d[n] is Δd. The space between the dividing surface at the position of d[n] and the dividing surface at the position of d[n+1] is the n-th subspace.

Returning to the description of FIG. 6, the voxel division unit 132 generates information indicating the position, the shape, and the size of an approximate column for each partial Fresnel zone (hereinafter referred to as "approximate column information") (step S104). The partial Fresnel zones are the N Fresnel zones 906 divided by the dividing surfaces. Hereinafter, among the N partial Fresnel zones, the partial Fresnel zone that is the n-th closest to the transmission station is referred to as the n-th partial Fresnel zone. In other words, the n-th partial Fresnel zone is a space in which the n-th subspace and the Fresnel zone 906 overlap.

The approximate column is a column having a bottom surface perpendicular to the station-connecting line segment 903 and approximating the partial Fresnel zone. Approximating the partial Fresnel zone means that the column satisfies predetermined conditions of the approximation of the shape and the size with respect to the shape and the size of the partial Fresnel zone (hereinafter referred to as "partial Fresnel zone approximation conditions"). The partial Fresnel zone approximation condition is, for example, a condition that the n-th approximate column is inscribed in the n-th partial Fresnel zone. The n-th approximate column is a column included in the n-th subspace. The partial Fresnel zone approximation condition may be, for example, a condition that the n-th approximate column is circumscribed to the n-th partial Fresnel zone. The partial Fresnel zone approximation condition may be, for example, a condition that a cross section of the n-th approximate column parallel to the bottom surface of the n-th approximate column is inscribed in the central cross section of the n-th partial Fresnel zone (hereinafter referred to as a midpoint cross section condition"). The central cross section is a cross section of the n-th partial Fresnel zone on a plane passing through the midpoint on the station-connecting line segment 903 in the n-th partial Fresnel zone and perpendicular to the station-connecting line segment 903. The bottom surface of the approximate column may be, for example, a circle or a regular polygon. For example, when the bottom surface of the n-th approximate column is a circle, the radius of the bottom surface of the n-th approximate column satisfying the midpoint cross section condition is equal to the radius at the central position of the n-th partial Fresnel zone. Hereinafter, for the purpose of simplifying the description, the shielding rate calculation device 1 will be described by taking a case, as an example, in which the n-th approximate column is a cylinder satisfying the midpoint cross section condition.

The approximate column information may indicate the position, the shape, and the size of the approximate column by, for example, the position of the apex of the approximate column. The approximate column information may indicate the position, the shape, and the size of the approximate column by, for example, the position, the shape, and the size of the center of gravity of the approximate column.

Figure 8:
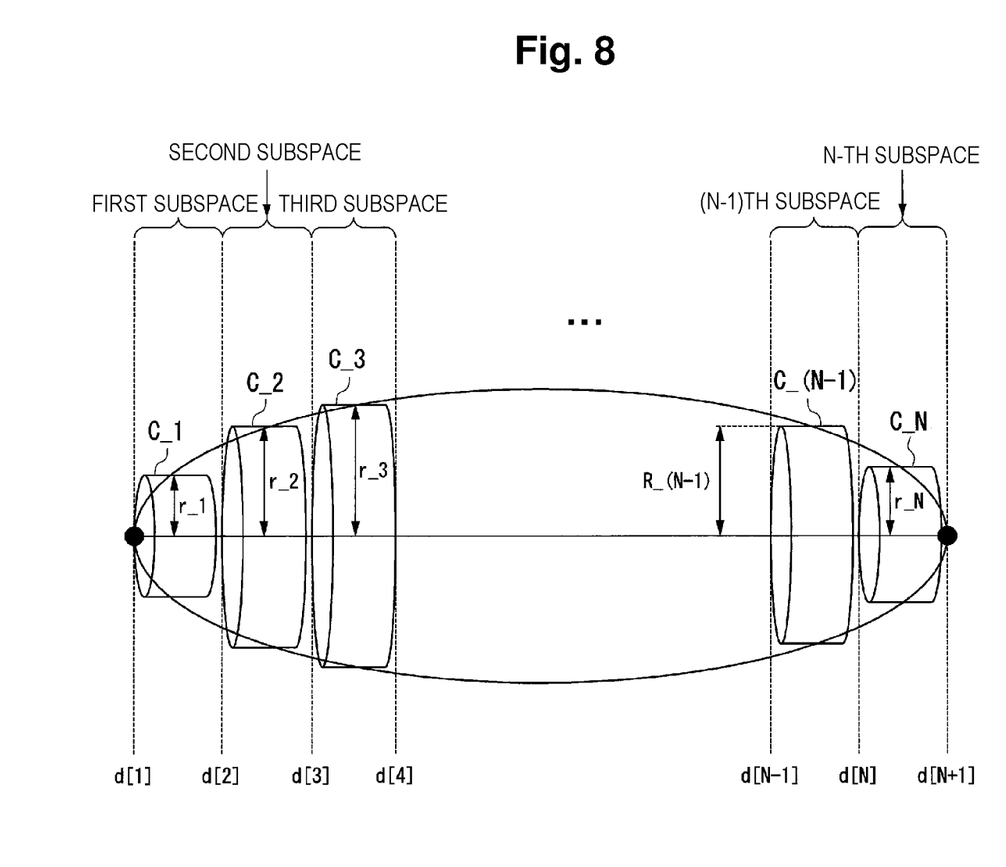
FIG. 8 is an explanatory diagram illustrating an approximate column in an embodiment.

FIG. 8 is an explanatory diagram illustrating the approximate column in the embodiment. In FIG. 8, the space where the n-th subspace and the Fresnel zone overlap is the n-th partial Fresnel zone. In FIG. 8, the n-th approximate column that approximates the n-th partial Fresnel zone is a cylinder C_n. The radius of the cylinder C_n is a radius r_n. The radius r_n is a radius r in which $d_1$ in the expression (1) satisfies the following expression (2).

[Math. 2]

$$d_1 = \frac{d[n] + d[n+1]}{2} \qquad (2)$$

Returning to the description of FIG. 6, the voxel division unit 132 determines the size of the voxel for each subspace on the basis of the acquisition condition information and the position, the shape, and the size of the partial Fresnel zone (step S105). More specifically, the size of the bottom surface of the voxel is determined for each subspace. The voxel is a column having a bottom surface perpendicular to the station-connecting line segment 903. The height of the voxels in the n-th subspace is equal to the length of the station-connecting line segment 903 in the n-th subspace. Hereinafter, a process of determining the voxel size is referred to as a voxel size determination process.

Figure 9:
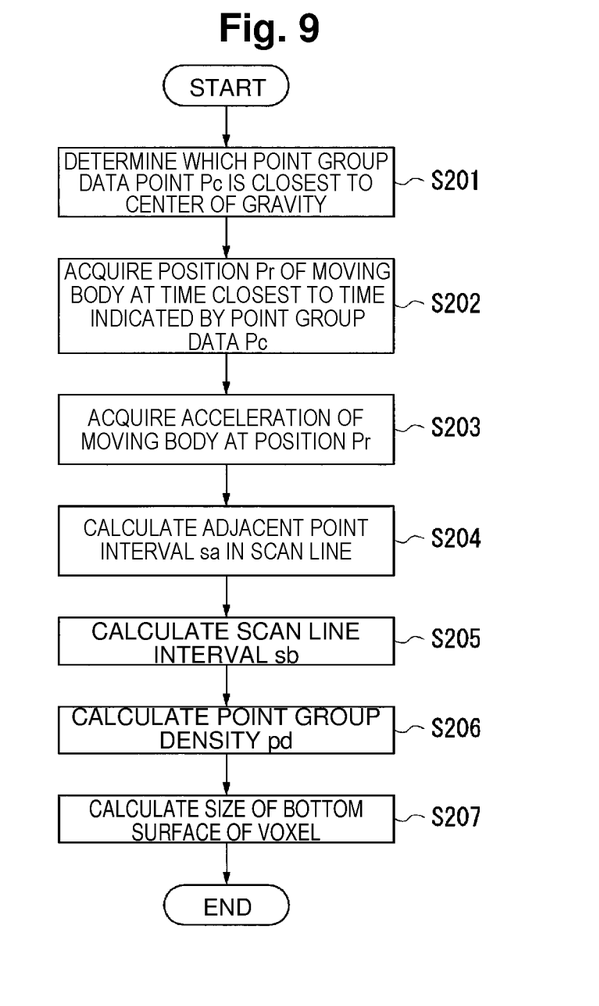
FIG. 9 is a flowchart showing an example of a specific processing flow of a voxel size determination process in an embodiment.
Figure 10:
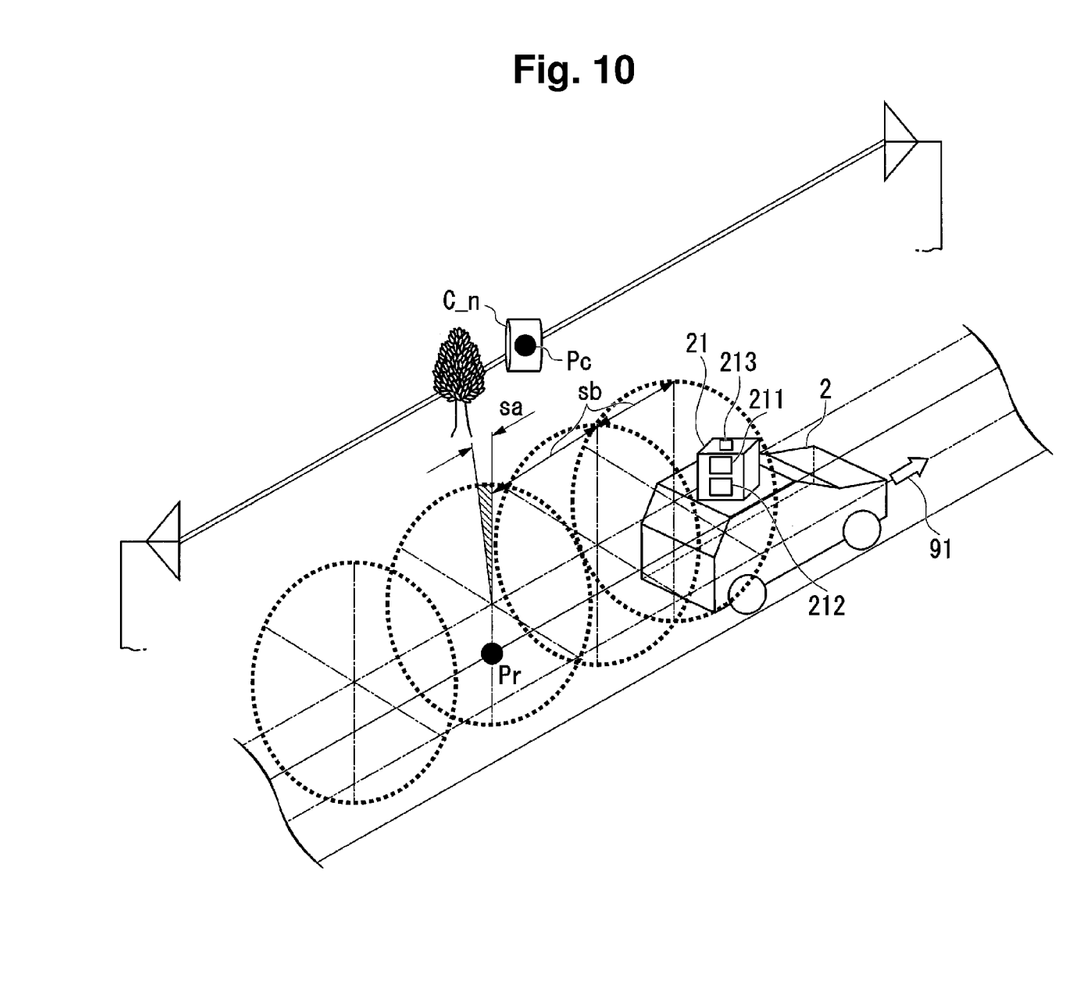
FIG. 10 is an explanatory diagram illustrating a point group data point Pc and a position Pr in an embodiment.

With reference to FIGS. 9 and 10, the voxel size determination process in step S105 will be described. FIG. 9 is a flowchart showing an example of a specific processing flow of the voxel size determination process in the embodiment. The voxel division unit 132 executes the processing shown in FIG. 9 to each n-th approximate column. For the purpose of simplifying the description, a case in which the processing is executed to the n-th approximate column is described as an example in FIG. 9.

The voxel division unit 132 determines which point group data point is the point group data point closest to the center of gravity of the n-th approximate column (step S201). Hereinafter, a point group data point determined to be the closest to the center of gravity of the n-th approximate column by the processing of step S201 is referred to as a point group data point Pc. Subsequently, the voxel division unit 132 acquires, on the basis of the moving body information, a position Pr of the three-dimensional laser scanner 21 at a time Pt that is closest to the time indicated by the point information corresponding to the point group data point Pc (step S202).

FIG. 10 is an explanatory diagram illustrating the point group data point Pc and the position Pr in the embodiment. FIG. 10 shows that the point group data point Pc is located at the center of gravity of the cylinder C_n. FIG. 10 shows that the position Pr is on the movement path on which the moving body 2 has moved.

Returning to the description of FIG. 9, the voxel division unit 132 subsequently calculates a velocity qr of the three-dimensional laser scanner 21 at the time Pt on the basis of the moving body information (step S203). Subsequently, the voxel division unit 132 calculates the adjacent point interval sa in the scan line on the basis of the position of the point group data point Pc, the position Pr, the emission direction information, and the emission timing information (step S204). The adjacent point interval sa in the scan line is calculated by the following expression (3).

[Math. 3]

$$sa = \omega \times R \quad (3)$$

In the expression (3), ω represents a measurement angle pitch. The measurement angle pitch ω is an angular velocity at which the direction of emission of the wave packet rotates. In the expression (3), R represents a distance between the point group data point Pc and the position Pr.

Subsequently, the voxel division unit 132 calculates the scan line interval sb on the basis of the emission direction information and the emission timing information (step S205). The scan line interval sb is calculated by the following expression (4).

[Math. 4]

$$sb = \frac{qr}{H} \quad (4)$$

In the expression (4), H represents a laser rotation number. The laser rotation number is the number of times at which the laser scanner 21 rotates the direction of emission of the laser wave packet by 360° in a unit time. For example, when the dimension of the measurement angle pitch ω is rad/sec, the laser rotation number H is ω/2π Hz.

Subsequently, the voxel division unit 132 calculates a point group density pd represented by the following expression (5) (step S206). The point group density pd is the density of the point group data points in the n-th partial Fresnel zone when the n-th partial Fresnel zone is filled with shielding objects.

[Math. 5]

$$pd = \frac{1}{sa \times sb} \quad (5)$$

Subsequently, the voxel division unit 132 calculates the size of the bottom surface of the voxel in the n-th subspace on the basis of the area of the bottom surface of the n-th approximate column and the point group density pd (step S207). Specifically, the voxel division unit 132 acquires, as the size of the bottom surface of the voxel in the n-th subspace, a value obtained by dividing the area of the bottom surface of the n-th approximate column by the point group density pd. When the shape of the bottom surface of the voxel is square, the length of one side of the bottom surface of the voxel in the n-th subspace is the square root of the value obtained by dividing the area of the bottom surface of the n-th approximate column by the point group density pd.

As described above, the area of the bottom surface of the voxel in the n-th subspace is the reciprocal of the point group density pd, which is the density of the point group data points in the n-th partial Fresnel zone when the n-th partial Fresnel zone is filled with shielding objects. Therefore, the cross section of the voxel that overlaps the n-th partial Fresnel zone and is perpendicular to the station-connecting line segment 903 includes at most one point group data point in the plane.

Returning to the description of FIG. 6, subsequent to step S105, the voxel division unit 132 divides the partial Fresnel zone by the voxel having the size determined by executing the voxel size determination process (step S106). Subsequently, the calculation unit 133 calculates the radio wave shielding rate on the basis of the position, the shape, and the size of the voxel at the position indicated by the point group data (hereinafter referred to as the "shielding voxel") among the voxels (step S107). Hereinafter, the process executed by the calculation unit 133 in step S107 is referred to as the radio wave shielding rate calculation process.

In the radio wave shielding rate calculation process, the calculation unit 133 first determines whether or not each of the voxels is an approximate column voxel. The approximate column voxel is a voxel having a degree, which is greater than or equal to a predetermined degree, of overlap with the approximate column. The predetermined degree is greater than 0. The degree of 0 means that there is no overlap. The predetermined degree may be different or the same for each approximate column. Hereinafter, a set of approximate column voxels in which the overlap with the n-th approximate column is equal to or greater than a predetermined degree is referred to as an n-th approximate column voxel set.

Figure 11:
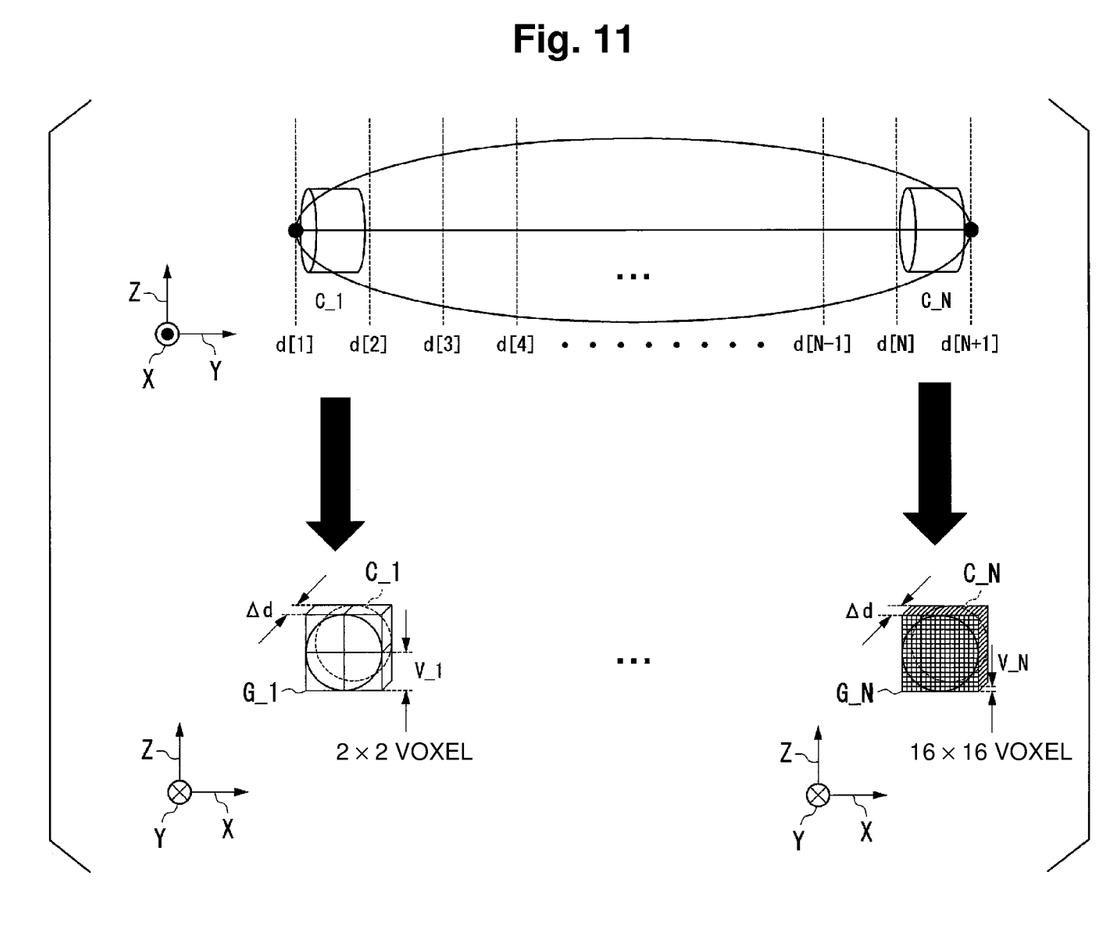
FIG. 11 is an explanatory diagram illustrating the relationship between an n-th approximate column voxel set and approximate column voxels in an embodiment.

FIG. 11 is an explanatory diagram illustrating the relationship between the n-th approximate column voxel set and the approximate column voxels in the embodiment. As a specific example, FIG. 11 describes the relationship among a first approximate column voxel set, an N-th approximate column voxel set, and the approximate column voxels. Specifically, FIG. 11 shows that the first approximate column voxel set G_1 is a set of 2×2 approximate column voxels each having a square with one side V_1 as a bottom surface and a height of Δd. FIG. 11 shows that the N-th approximate column voxel set G_N is a set of 16×16 approximate column voxels each having a square with one side V_N as a bottom surface and a height of Δd.

Subsequently, the calculation unit 133 determines whether or not each of the approximate column voxels includes the point group data point. Hereinafter, a voxel determined to include the point group data point is referred to as a shielding voxel.

The calculation unit 133 deforms each of the two bottom surfaces of all n-th approximate columns, regardless of the n-th approximate column, into a figure having the same size and shape (hereinafter referred to as a "reference figure"). The deformation in which the bottom surface of the n-th approximate column is deformed into the reference figure is referred to as an n-th standardization deformation. Hereinafter, when each of the deformation from the first standardization deformation to the N-th standardization deformation is not distinguished, the deformation is referred to as a standardization deformation. The calculation unit 133 also executes the n-th standardization deformation on the n-th approximate column voxel set. A set of a plurality of approximate columns after deformation (hereinafter referred to as a "standard column") is a column. The shielding voxel is also deformed by the n-th standardization deformation. Hereinafter, the bottom surface of the shielding voxel after deformation is referred to as a shielding surface.

The calculation unit 133 acquires an area of one bottom surface of the standard column in which a deformed shielding voxel does not exist in the height direction of the standard column (hereinafter referred to as a "shielding area"). In other words, the calculation unit 133 projects the bottom surfaces of all shielding voxels from the first shielding voxel to the N-th shielding voxel onto the reference figure, and acquires the areas of the figure projected on the reference figure (hereinafter referred to as the "shielding figure"). The calculation unit 133 calculates the ratio of the shielding area (that is, the area of the shielding figure) to the area of one bottom surface of the standard column (that is, the area of the reference figure). The calculated ratio is the radio wave shielding rate.

Figure 12:
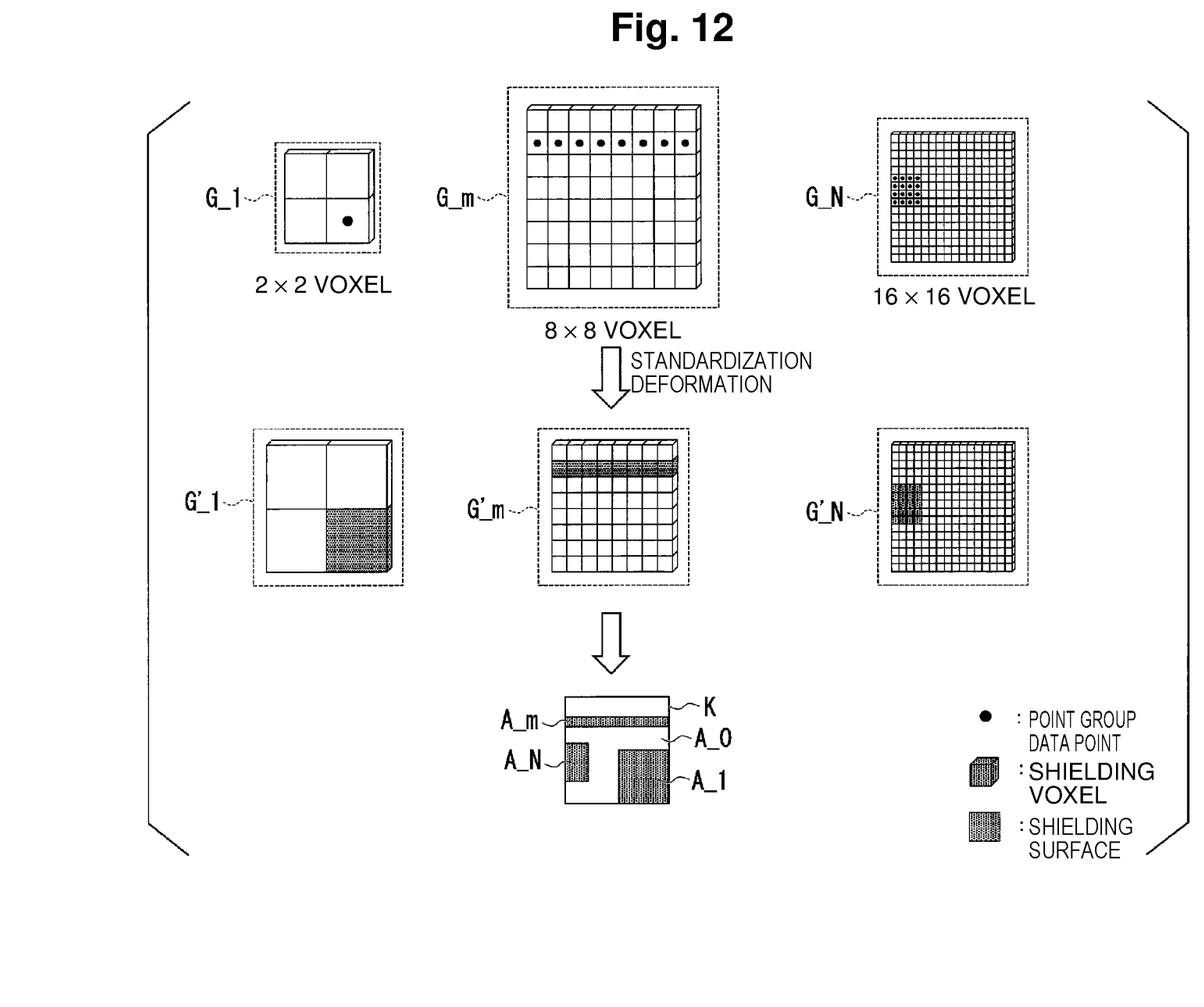
FIG. 12 is an explanatory diagram illustrating shielding voxels, standardization deformation, and shielding surfaces in an embodiment.

FIG. 12 is an explanatory diagram illustrating the shielding voxels, the standardization deformation, and the shielding surfaces in the embodiment. FIG. 12 describes the radio wave shielding rate calculation process by using the first approximate column voxel set G_1, the m-th approximate column voxel set G m (m is an integer of 2 or more and less than N), and the N-th approximate column voxel set G N. In FIG. 12, the first approximate column voxel set G_1 is a set of 2×2 approximate column voxels, which is the same as in FIG. 11. In FIG. 12, the N-th approximate column voxel set G N is a set of 16×16 approximate column voxels, which is the same as in FIG. 11. In FIG. 12, the m-th approximate column voxel set G m is a set of 8×8 approximate column voxels. The sizes in the bottom surface of the first approximate column voxel set G_1 and the bottom surface of the m-th approximate column voxel set G m are different. In the first approximate column voxel set G_1, the m-th approximate column voxel set G m, and the N-th approximate column voxel set G N, the dots in the approximate column voxels are the point group data points. FIG. 12 shows, for example, that the point group data point is located in the approximate column voxel in the lower right in the first approximate column voxel set G_1. Therefore, the approximate column voxel at the lower right of the first approximate column voxel set G_1 is a shielding voxel (a first shielding voxel).

FIG. 12 shows the first approximate column voxel set G_1 after the first standardization deformation (hereinafter referred to as the "first approximate column voxel set G'_1"). FIG. 12 shows the m-th approximate column voxel set G m after the m-th standardization deformation (hereinafter referred to as the "m-th approximate column voxel set G'_m"). FIG. 12 shows the N-th approximate column voxel set G N after the N-th standardization deformation (hereinafter referred to as the "N-th approximate column voxel set G'_N"). The bottom surface of the first approximate column voxel set G'_1, the bottom surface of the m-th approximate column voxel set G'_m, and the bottom surface of the N-th approximate column voxel set G'_N have the same shape and the same area.

FIG. 12 shows the positions, on the reference figure K, of a shielding surface A_1 of the first approximate column voxel set G'_1, a shielding surface A_m of the m-th approximate column voxel set G'_m, and a shielding surface A_N of the N-th approximate column voxel set G'_N. The shielding area is an area of regions excluding a non-shielding region A_0 from the reference figure K, of the regions in the plane of the reference figure K. The non-shielding region A_0 is a region that is not the shielding surface A_1, the shielding surface A_m, nor the shielding surface A_N, of the regions in the plane of the reference figure K.

The shielding rate calculation device 1 of the embodiment configured as described above divides the Fresnel zone into a plurality of voxels each having a size corresponding to the acquisition condition information indicating the conditions at the time of acquiring the point group data in the inter-wireless-station space. Then, the shielding rate calculation device 1 calculates the shielding rate against a radio wave in the inter-wireless-station space on the basis of the position, the shape, and the size of the shielding voxel, which is a voxel at a position indicated by the point group data, among the plurality of voxels. Therefore, the shielding rate calculation device 1 configured as described above can accurately calculate the shielding rate against a radio wave between the wireless stations even when the distance between the moving body 2 and the shielding object changes at the time of acquiring the point group data.

Modifications

Note that the point group data do not necessarily have to be acquired by the three-dimensional laser scanner 21 fixed to the moving body 2. The point group data may be acquired by, for example, a camera fixed to the moving body 2. In this case, the emission direction information may be the direction of the camera, and the emission timing information may be the shooting timing of the camera.

Note that the moving body 2 provided with the three-dimensional laser scanner 21 is an example of a point group data acquisition system. The shielding voxel deformed by the n-th standardization deformation is an example of the n-th shielding voxel. The shielding voxel in the first approximate column voxel set G'_1 in FIG. 12 is an example of the first shielding voxel. The shielding voxel in the N-th approximate column voxel set G'_N in FIG. 12 is an example of the N-th shielding voxel.

Note that the shielding rate calculation device 1 may be implemented by using a plurality of information processing devices communicably connected via a network. In this case, each functional unit included in the shielding rate calculation device 1 may be distributed and implemented over the plurality of information processing devices. For example, the voxel division unit 132 and the calculation unit 133 may be mounted on different information processing devices. Note that all or a part of the respective functions of the shielding rate calculation device 1 may be realized by using hardware such as an ASIC (Application Specific Integrated Circuit), a PLD (Programmable Logic Device), and an FPGA (Field Programmable Gate Array). The program may be recorded on a computer-readable recording medium. The computer-readable recording medium is, for example, a portable medium such as a flexible disk, a magneto-optical disk, an ROM, or a CD-ROM, or a storage device such as a hard disk built in a computer system. The program may be transmitted via a telecommunication line.

As described above, the embodiment of the present invention has been described in detail with reference to the drawings, but the specific configuration is not limited to the present embodiment, and the design and the like within a range not deviating from the gist of the present invention are also included.

REFERENCE SIGNS LIST

1 Shielding rate calculation device
11 Communication unit
12 Storage unit
13 Control unit
2 Moving body
21 Three-dimensional laser scanner
211 Emission unit
212 Reception unit
213 Point group data calculation unit
901 Transmission station
902 Reception station

The invention claimed is:

1. A shielding rate calculation device, comprising:
a processor; and
a storage medium having computer program instructions stored thereon, when executed by the processor, perform to:
dividing a Fresnel zone into a plurality of voxels each having a size corresponding to acquisition conditions at the time of acquiring point group data indicating a shielding object in an inter-wireless-station space between a transmission station and a reception station; and
calculating a shielding rate against a radio wave traveling from the transmission station toward the reception station on the basis of a position, a shape, and a size of a shielding voxel, which is a voxel at a position indicated by the point group data, among the plurality of voxels.

2. The shielding rate calculation device according to claim 1, wherein a subspace that is the n-th (n is an integer of 1 or more and N or less) closest to the transmission station, among subspaces that are N (N is an integer of 1 or more) spaces obtained by dividing equally the inter-wireless-station space in the direction of from the transmission station toward the reception station, is defined as an n-th subspace, the Fresnel zone included in the n-th subspace is defined as an n-th partial Fresnel zone, and the computer program instructions further perform to determines a size of the voxel in the n-th subspace on the basis of the acquisition conditions and a position, a shape, and a size of the n-th partial Fresnel zone.

3. The shielding rate calculation device according to claim 2, wherein a column having a bottom surface perpendicular to a line segment connecting the transmission station and the reception station and approximating the n-th partial Fresnel zone is defined as an n-th approximate column, and the computer program instructions further perform to determines a size of a bottom surface of a voxel in the n-th subspace on the basis of an area of a bottom surface of the n-th approximate column and the acquisition conditions.

4. The shielding rate calculation device according to claim 3, wherein the computer program instructions further perform to, with a set of the voxels approximating the n-th approximate column defined as an n-th approximate column voxel set, executes an n-th standardization deformation that deforms a shape and size of a bottom surface of the n-th approximate column voxel set into a reference figure having a same size and shape regardless of the n-th approximate column, and with the shielding voxel after the n-th standardization deformation defined as an n-th shielding voxel, calculates the shielding rate on the basis of an area of a shielding figure that is a figure on the reference figure onto which bottom surfaces of all shielding voxels from a first shielding voxel to an N-th shielding voxel are projected.

5. The shielding rate calculation device according to claim 1:
wherein a point group data acquisition system for acquiring the point group data is provided with a moving body including an emission unit that emits a laser intermittently at a constant cycle while rotating a direction of emission at a constant angular velocity; and
wherein the acquisition conditions include information on a movement of the moving body, emission direction information that is information indicating an emission direction of a wave packet of the laser emitted by the emission unit, and emission timing information that is information on emission timing of the wave packet of the laser emitted by the emission unit.

6. The shielding rate calculation device according to claim 1, wherein the voxel has a bottom surface perpendicular to a line segment connecting the transmission station and the reception station.

7. A non-transitory computer-readable medium having computer-executable instructions that, upon execution of the instructions by a processor of a computer, cause the computer to function as the shielding rate calculation device according to claim 1.

8. A shielding rate calculation method, comprising:
a voxel division step of dividing a Fresnel zone into a plurality of voxels each having a size corresponding to acquisition conditions at the time of acquiring point group data indicating a shielding object in an inter-wireless-station space between a transmission station and a reception station; and
a calculation step of calculating a shielding rate against a radio wave traveling from the transmission station toward the reception station on the basis of a position, a shape, and a size of a shielding voxel, which is a voxel at a position indicated by the point group data, among the plurality of voxels.

* * * * *